(12) United States Patent
Fuller

(10) Patent No.: US 9,429,104 B2
(45) Date of Patent: Aug. 30, 2016

(54) SYSTEMS AND METHODS FOR CASTING HYBRID ROCKET MOTOR FUEL GRAINS

(75) Inventor: Jerome Keith Fuller, Lake Balboa, CA (US)

(73) Assignee: The Aerospace Corporation, El Segundo, CA (US)

( * ) Notice: Subject to any disclaimer, the term of this patent is extended or adjusted under 35 U.S.C. 154(b) by 79 days.

(21) Appl. No.: 13/564,463

(22) Filed: Aug. 1, 2012

(65) Prior Publication Data

US 2013/0042951 A1 Feb. 21, 2013

Related U.S. Application Data

(60) Provisional application No. 61/513,989, filed on Aug. 1, 2011.

(51) Int. Cl.

| | | |
|---|---|---|
| B21D 53/00 | (2006.01) |
| F02K 9/14 | (2006.01) |
| F02K 9/72 | (2006.01) |
| F02K 9/36 | (2006.01) |
| F02K 9/18 | (2006.01) |
| B29C 33/38 | (2006.01) |
| B29C 33/52 | (2006.01) |
| B29C 39/00 | (2006.01) |
| B29C 39/26 | (2006.01) |

(Continued)

(52) U.S. Cl.
CPC .............. F02K 9/18 (2013.01); B21D 53/00 (2013.01); B29C 33/3857 (2013.01); B29C 33/52 (2013.01); B29C 39/006 (2013.01); B29C 39/26 (2013.01); B29C 67/0055 (2013.01); B64G 1/403 (2013.01); B64G 1/404 (2013.01); F02K 9/14 (2013.01); F02K 9/32 (2013.01); F02K 9/36 (2013.01); F02K 9/72 (2013.01); B29L 2031/3097 (2013.01); F05D 2230/21 (2013.01)

(58) Field of Classification Search
CPC .......... B21D 53/00; F02K 9/14; F02K 9/72; F02K 9/36
See application file for complete search history.

(56) References Cited

U.S. PATENT DOCUMENTS 2,877,504 A   3/1959 Fox
3,136,831 A   6/1964 Zinn
(Continued)

FOREIGN PATENT DOCUMENTS

DE        2024897 B1    12/1971
DE     102005039906     3/2007
(Continued)

OTHER PUBLICATIONS

Search Report for International Application No. PCT/US2012/049218 mailed Oct. 30, 2012.
(Continued)

*Primary Examiner* — Aileen B Felton
(74) *Attorney, Agent, or Firm* — Sutherland Asbill & Brennan

(57) ABSTRACT

Embodiments of the invention relate to systems and methods for casting hybrid rocket motor fuel grains. In one embodiment, a method for casting a rocket motor fuel grain can be provided. The method can include providing a positive image of a port made from at least one material. The method can further include disposing at least one fuel material around at least a portion of the positive image of the port. Further, the method can include removing the at least one material, wherein a negative image of the port is formed in the at least one fuel material.

20 Claims, 6 Drawing Sheets

(51) Int. Cl.
*B64G 1/40* (2006.01)
*F02K 9/32* (2006.01)
*B29C 67/00* (2006.01)
*B29L 31/30* (2006.01)

(56) References Cited

U.S. PATENT DOCUMENTS

| | | |
|---|---|---|
| 3,142,152 A | 7/1964 | Sessums. Jr. |
| 3,144,830 A | 8/1964 | De Fries et al. |
| 3,166,898 A | 1/1965 | Hoeptner |
| 3,177,657 A | 4/1965 | Strauss et al. |
| 3,196,735 A | 7/1965 | Baldwin |
| 3,201,936 A | 8/1965 | Victor |
| 3,242,668 A | 3/1966 | Ellis |
| 3,256,819 A | 6/1966 | Leeper |
| 3,423,943 A | 1/1969 | Stark |
| 3,449,600 A | 6/1969 | Holzman |
| 3,468,125 A | 9/1969 | Cramer |
| 3,494,286 A | 2/1970 | Taylor |
| 3,646,597 A | 2/1972 | Feemster |
| 3,664,133 A | 5/1972 | Iwanciow et al. |
| 3,677,010 A | 7/1972 | Fink et al. |
| 3,715,888 A | 2/1973 | Massie |
| 3,789,610 A | 2/1974 | Stone |
| 3,844,118 A | 10/1974 | Wilkinson |
| 3,995,559 A | 12/1976 | Bice et al. |
| 4,015,427 A | 4/1977 | Brooks |
| 4,148,187 A | 4/1979 | Younkin |
| 4,314,509 A | 2/1982 | Dalet |
| 4,406,863 A | 9/1983 | Jenkins |
| 4,458,607 A | 7/1984 | Schoeber et al. |
| 4,483,139 A | 11/1984 | Engl |
| 4,510,874 A | 4/1985 | Hasenack |
| 4,730,601 A | 3/1988 | Hubele et al. |
| 5,119,627 A | 6/1992 | Bradford et al. |
| 5,339,625 A | 8/1994 | McKinney et al. |
| 5,367,872 A | 11/1994 | Lund et al. |
| 5,386,777 A | 2/1995 | Lou et al. |
| 5,529,648 A | 6/1996 | Stickler |
| 5,619,011 A | 4/1997 | Dean |
| 5,619,073 A | 4/1997 | Posey et al. |
| 5,623,115 A | 4/1997 | Lauritzen et al. |
| 5,714,711 A | 2/1998 | Schumacher et al. |
| 5,715,675 A | 2/1998 | Smith et al. |
| 5,765,361 A | 6/1998 | Jones et al. |
| 5,794,435 A | 8/1998 | Jones |
| 6,014,857 A | 1/2000 | Stinnesbeck |
| 6,082,097 A | 7/2000 | Smith et al. |
| 6,092,366 A | 7/2000 | Smith et al. |
| 6,125,763 A | 10/2000 | Kline et al. |
| 6,148,610 A | 11/2000 | Calabro et al. |
| 6,165,307 A | 12/2000 | Fair et al. |
| 6,311,479 B1 | 11/2001 | Lo |
| 6,796,171 B2 | 9/2004 | Heisler et al. |
| 6,865,878 B2 | 3/2005 | Knuth et al. |
| 6,880,326 B2 | 4/2005 | Karabeyoglu et al. |
| 7,022,196 B2 | 4/2006 | Cesaroni et al. |
| 7,955,453 B1 | 6/2011 | Kelley et al. |
| 8,225,507 B2 | 7/2012 | Fuller |
| 8,601,790 B2 | 12/2013 | Fuller |
| 2002/0028854 A1 | 3/2002 | Allanic et al. |
| 2002/0036038 A1 | 3/2002 | Karabeyoglu et al. |
| 2002/0062756 A1 | 5/2002 | Archer |
| 2003/0004599 A1 | 1/2003 | Herbak |
| 2004/0068976 A1 | 4/2004 | Knuth et al. |
| 2005/0120703 A1 | 6/2005 | Rohrbaugh et al. |
| 2006/0005729 A1 | 1/2006 | Milton et al. |
| 2009/0217525 A1* | 9/2009 | Fuller ........................ 29/890.01 |
| 2009/0217642 A1 | 9/2009 | Fuller |
| 2010/0281850 A1 | 11/2010 | Fuller |
| 2010/0307131 A1 | 12/2010 | Danforth et al. |
| 2012/0285016 A1 | 11/2012 | Fuller |
| 2013/0031888 A1 | 2/2013 | Fuller |
| 2013/0042596 A1 | 2/2013 | Fuller |

FOREIGN PATENT DOCUMENTS

| | | |
|---|---|---|
| EP | 0426363 A2 | 5/1991 |
| FR | 1315914 A | 1/1963 |
| WO | 96/12610 A2 | 5/1996 |
| WO | 00/05133 A2 | 2/2000 |
| WO | 03/089218 A1 | 10/2003 |
| WO | 2009/145947 | 12/2009 |

OTHER PUBLICATIONS

Written Opinion for International Application No. PCT/US2012/049218 mailed Oct. 30, 2012.
Search Report and Written Opinion for International Application No. PCT/US2012/049218 mailed Oct. 30, 2012.
Dornhaim, M.A., "Ideal Hybrid Fuel is . . . Wax?", Aviation Week and Space Technology, McGraw-Hill Company, New York, NY, vol. 158, No. 5, Feb. 3, 2003, pp. 52-54.
Search Report and Written Opinion for International Application No. PCT/US2012/049185 mailed Feb. 27, 2013.
Search Report for International Application No. PCT/US2012/049153 mailed Oct. 17, 2012.
Written Opinion for International Application No. PCT/US2012/049153 mailed Oct. 17, 2012.
International Search Report dated Sep. 23, 2009 for International Application No. PCT/US09/35545.
Written Opinion of the International Searching Authority dated Sep. 23, 2009 for International Application No. PCT/US09/35545.
Pham, D.T., Gault, R.S., "A Comparison of Rapid Prototyping Technoiogies", International Journal of Machine Tools & Manufacture, vol. 38, No. 10-11, 1998, pp. 1257-1287.
Hinkley, D., "A Novel Cold Gas Propulsion System for Nanosatellites and Picosatellites," AIAA/USU Conference on Small Satellites, AIAA, Utah State University, Utah, 2008.
Altman, D., and Holzman, A., "Overview and History of Hybrid Rocket Propulsion," Fundamentals of Hybrid Rocket Combustion and Propulsion, edited by M. J. Chiaverini and K. K. Kuo, Progress in Astronautics and Aeronautics, AIAA, Reston, Virginia, 2007, pp. 1-33.
Boardman, T. A., "Hybrid Propellant Rockets," Rocket Propulsion Elements, edited by G. P. Sutton and O. Biblarz, Wiley-interscience, New York, 2001, pp. 579-608.
Altman, D., and Humble, R., "Hybrid Rocket Propulsion Systems," Space Propulsion Analysis and Design, edited by R. W. Humble, G. N. Henry, and W. J. Larson, Space Technology Series, McGraw-Hill Companies, Inc, New York, 1995, pp. 365-443.
Karabeyoglu, M. A., Zilliac, G., Cantwell, B.J., DeZilwa, S., and Castelluci, P. "Scale-Up Tests of High Regression Rate Paraffin-Based Hybrid Rocket Fuels" Journal of Propulsion and Power, vol. 20, No. 6, 2004, pp. 1037-1045.
Search Report and Written Opinion for International Application No. PCT/US2012/049153 mailed Oct. 17, 2012.

* cited by examiner

SYSTEMS AND METHODS FOR CASTING HYBRID ROCKET MOTOR FUEL GRAINS

RELATED APPLICATION

This application claims priority under 35 U.S.C. §119(e) to U.S. Provisional Patent Application No. 61/513,989, titled Systems and Methods for Casting Hybrid Rocket Motor Fuel Grains, filed on Aug. 1, 2011, the entire contents of which are hereby incorporated herein by reference.

TECHNICAL FIELD

The invention relates generally to solid fuel hybrid rocket motors, and more particularly to systems and methods for casting hybrid rocket motor fuel grains.

BACKGROUND

Hybrid rocket motors or "hybrid motors" have recently been given greater attention in the space community. Hybrid motors use reactants of different physical phase states, usually a solid fuel such as rubber and a liquid or gaseous oxidizer, such as nitrous oxide. Hybrid motors do not generally deliver the performance of liquid motors. However, hybrid motors are safer and simpler to build and to operate. Hybrid motors can have good performance but often have problems maintaining the proper fuel to oxidizer ratio over the duration of the burn. Hybrid motors also tend to be physically long along the rocket motor axis for the same reasons. Hybrid motors can have complicated systems for introducing the gaseous oxidizer portion at different positions length-wise in the fuel section.

Hybrid solid fuel bodies are generally two-dimensional shapes extruded into the third dimension, for a simple example, a thick-walled tube extruded along the length of the tube. Such a tube is characterized as having a center axial flow channel. The oxidizer is injected through an intake opening and into the solid fuel body and out through a nozzle as exhaust. The fuel is ignited by an igniter positioned proximal to where the oxidizer first contacts the fuel near the intake. The solid fuel bodies generally have a center elongated flow channel through which the oxidizer flows after ignition for ablating the fuel on the side walls of the center elongated flow channel. The fuel is burned on the internal surface effectively ablating the solid fuel interior walls. As the fuel is burned, the combustion becomes oxidizer rich. Oxidizer rich burning provides poor burning efficiency of the solid fuel. Complex fuel grain shapes are sometimes used to increase the amount of surface area in the elongated center flow channel, but sometimes at the risk of an unsupported section of fuel breaking off and plugging the nozzle, causing a catastrophic failure of the hybrid motor. As the fuel burns through the elongated center flow channel, the oxidizer burns the inside of the channel. The growing diameter of the elongated center flow channel changes the ratio between the oxidizer flowing in the channel and the exposed burning fuel on the side walls of the elongated center flow channel. The hybrid rocket motor suffers from changing oxidizer to fuel ratio. The oxidizer to fuel ratio becomes oxidizer rich and thereby wastes available oxidizer that could otherwise be used for more burning of the fuel.

Another problem that is associated with hybrid motors, at least for use in launch vehicles, is low regression rates, typically one third of that of composite solid propellants. Regression rate is the depth-wise rate at which the fuel is removed from the surface where burning occurs. This is a factor in the development of rocket engine thrust. A great amount of research has gone into replacing the solid rocket boosters on the space shuttle with hybrid motors only to show that hybrids suffer from low regression rates, which may make replacing large solid motors very difficult.

SUMMARY

Embodiments of the invention can address some or all of the above needs. Certain embodiments of the invention can provide systems and methods for casting hybrid rocket motor fuel grains. In one embodiment, a method for casting a rocket motor fuel grain can be provided. The method can include providing a positive image of a port made from at least one material wherein a rapid prototyping device is used to provide at least a portion of the positive image. The method can further include disposing at least one fuel material around at least a portion of the positive image of the port.

In one aspect of an embodiment, the method can further include removing the at least one material, wherein a negative image of the port is formed in the at least one fuel material.

In one aspect of an embodiment, the port can include at least one non-longitudinal feature.

In one aspect of an embodiment, the port can include at least one of the following: a helical shape, a concentric disk shape, a series of anteriorially linked disk shapes, a three-dimensional geometric shape with at least one non-longitudinal feature, or a thin walled structure incorporating some or all of the foregoing shapes.

In one aspect of an embodiment, the at least one material can include at least one of the following: a soluble polymer, or a water soluble polymer.

In one aspect of an embodiment, the at least one fuel material can include at least one of the following: hydroxyl terminated polybutadiene (HTPB), acrylonitrile butadiene styrene (ABS), a hybrid rocket motor fuel, one or more oxidizers, a composite solid rocket motor fuel, paraffin wax, acrylic, polyvinyl chloride, polycarbonate, acetyl, polyethylene, salami, wood, or paper.

In one aspect of an embodiment, removing the at least one material can include at least one of: melting the at least one material, dissolving the at least one material, or changing a state of the at least one material.

In one aspect of an embodiment, the method can further include disposing the at least one fuel material into a shaped cast.

In one aspect of an embodiment, the method can further include curing the at least one fuel material to form a negative image of the port in the cured fuel material.

In another embodiment, a system for casting a rocket motor fuel grain can be provided. The system can include a cast operable to receive a positive image of a port made from at least one material wherein a rapid prototyping device is used to provide at least a portion of the positive image. The system can further include a dispenser operable to dispose at least one fuel material around at least a portion of the positive image of the port.

In one aspect of an embodiment, the system can further include a device operable to remove the at least one material, wherein a negative image of the port is formed in the at least one fuel material.

In one aspect of an embodiment, the port can include at least one non-longitudinal feature.

In one aspect of an embodiment, the port can include at least one of the following: a helical shape, a concentric disk shape, a series of anteriorially linked disk shapes, a three-dimensional geometric shape with at least one non-longitudinal feature, or a thin walled structure incorporating some or all of the foregoing shapes.

In one aspect of an embodiment, the at least one material can include at least one of the following: a soluble polymer, or a water soluble polymer.

In one aspect of an embodiment, the at least one fuel material can include at least one of the following: hydroxyl terminated polybutadiene (HTPB), acrylonitrile butadiene styrene (ABS), a hybrid rocket motor fuel, one or more oxidizers, a composite solid rocket motor fuel, paraffin wax, acrylic, polyvinyl chloride, polycarbonate, acetyl, polyethylene, salami, wood, or paper.

In one aspect of an embodiment, the device is operable to remove the at least one material by facilitating at least one of: melting the at least one material, dissolving the at least one material, or changing a state of the at least one material.

In one aspect of an embodiment, the system can further include a curing device operable to form a negative image of the port in the at least one fuel material.

In yet another embodiment, an apparatus can be provided. The apparatus can be a rocket motor fuel grain including at least one fuel material, wherein a negative image of a port is formed in the at least one fuel material by removing at least one material from the at least one fuel material, wherein a rapid prototyping device is used to shape at least a portion of the at least one material.

In one aspect of an embodiment, the apparatus can further include a plurality of rocket motor fuel grains, wherein the plurality of rocket motor fuel grains is successively stacked.

In one aspect of an embodiment, the port can include at least one non-longitudinal feature.

In one aspect of an embodiment, the port can include at least one of the following: a helical shape, a concentric disk shape, a series of anteriorially linked disk shapes, a three-dimensional geometric shape with at least one non-longitudinal feature, or a thin walled structure incorporating some or all of the foregoing shapes.

In one aspect of an embodiment, the at least one material can include at least one of the following: a soluble polymer, or a water soluble polymer.

In one aspect of an embodiment, the at least one fuel material can include at least one of the following: hydroxyl terminated polybutadiene (HTPB), acrylonitrile butadiene styrene (ABS), a hybrid rocket motor fuel, one or more oxidizers, a composite solid rocket motor fuel, paraffin wax, acrylic, polyvinyl chloride, polycarbonate, acetyl, polyethylene, salami, wood, or paper.

In one aspect of an embodiment, the at least one material is removed from the at least one fuel material by at least one of: melting the at least one material, dissolving the at least one material, or changing a state of the at least one material.

Other systems, processes, apparatus, features, and aspects according to various embodiments of the invention will become apparent with respect to the remainder of this document.

BRIEF DESCRIPTION OF DRAWINGS

Figure 1:
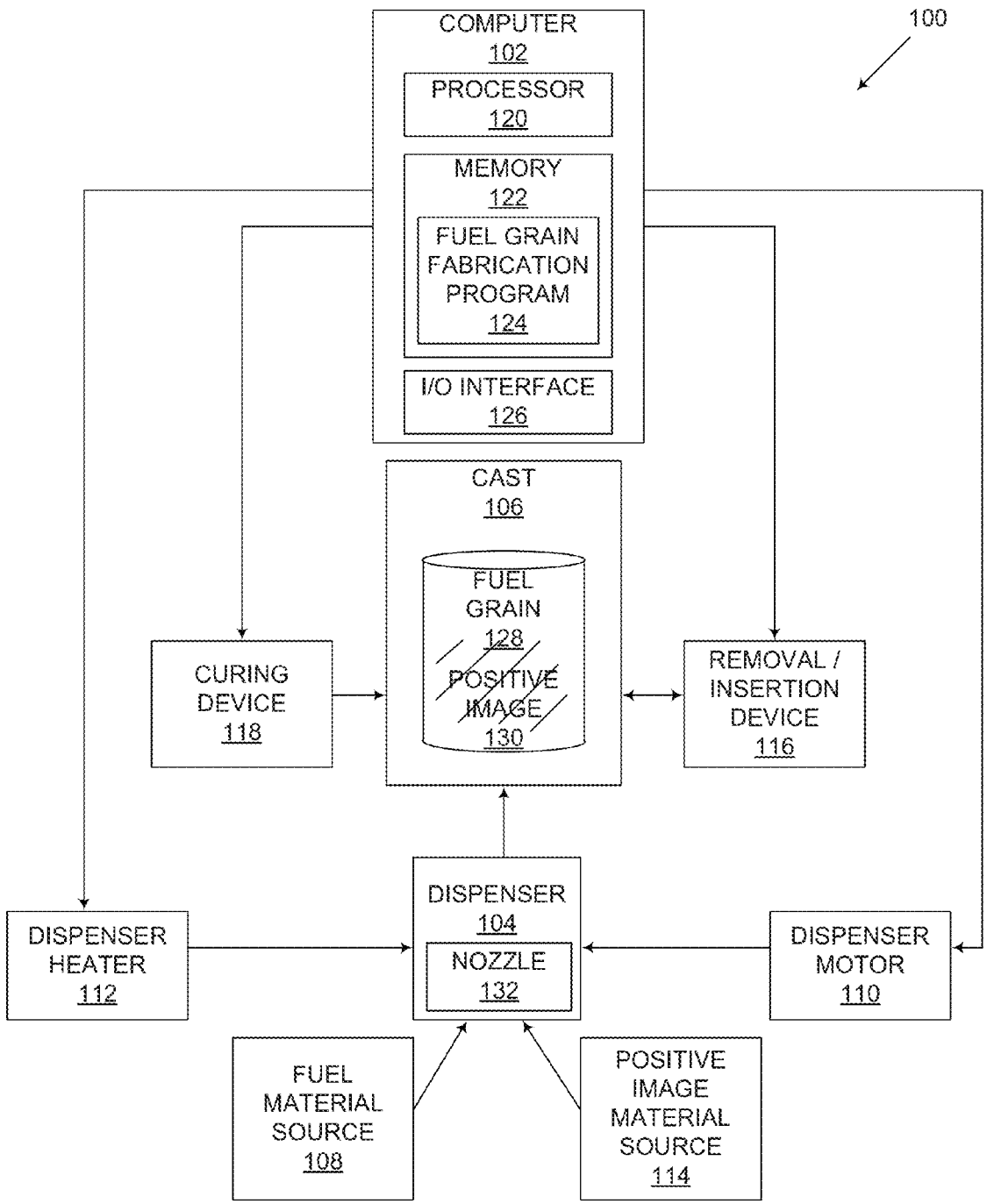

Having thus described embodiments of the invention in general terms, reference will now be made to the accompanying drawings, which are not drawn to scale, and wherein:

FIG. 1 illustrates an example system according to one embodiment of the invention.

Figure 2:
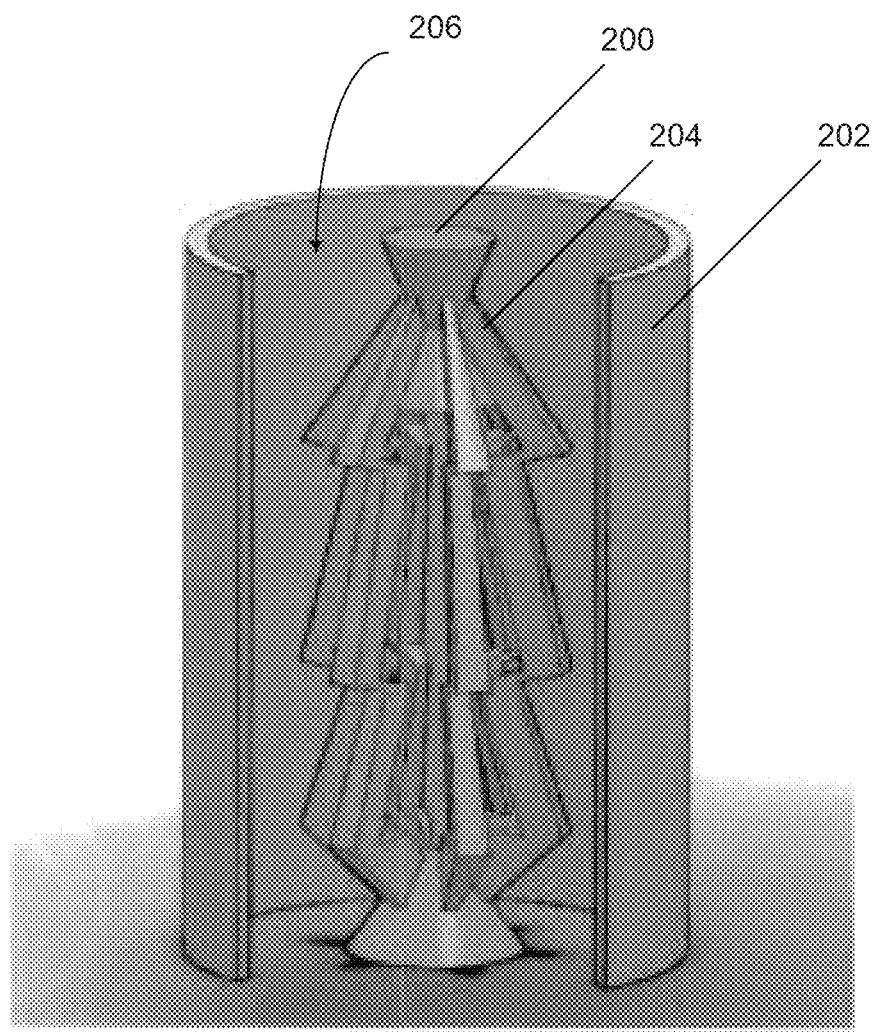

FIG. 2 illustrates a front cutaway view of an example cast with an example positive image of a desired port shape for an example fuel grain apparatus in accordance with one embodiment of the invention.

Figure 3:
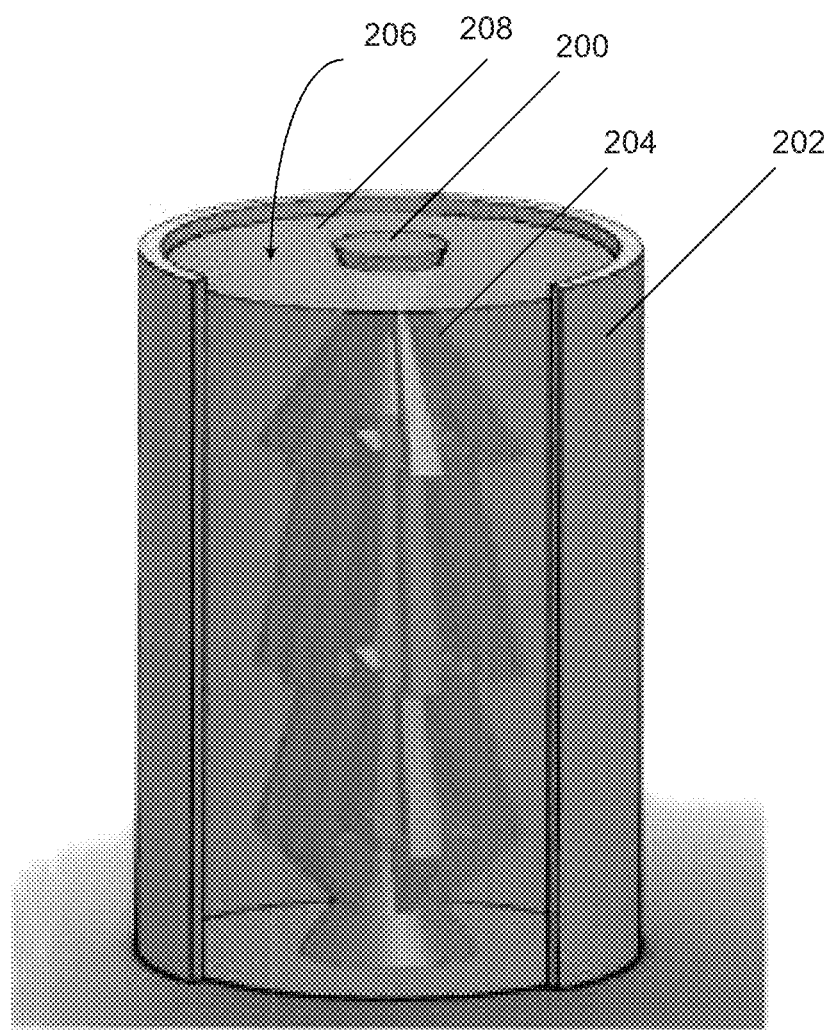

FIG. 3 illustrates a front cutaway view of an example cast with an example positive image of a desired port shape in an example fuel grain apparatus in accordance with one embodiment of the invention.

Figure 4:
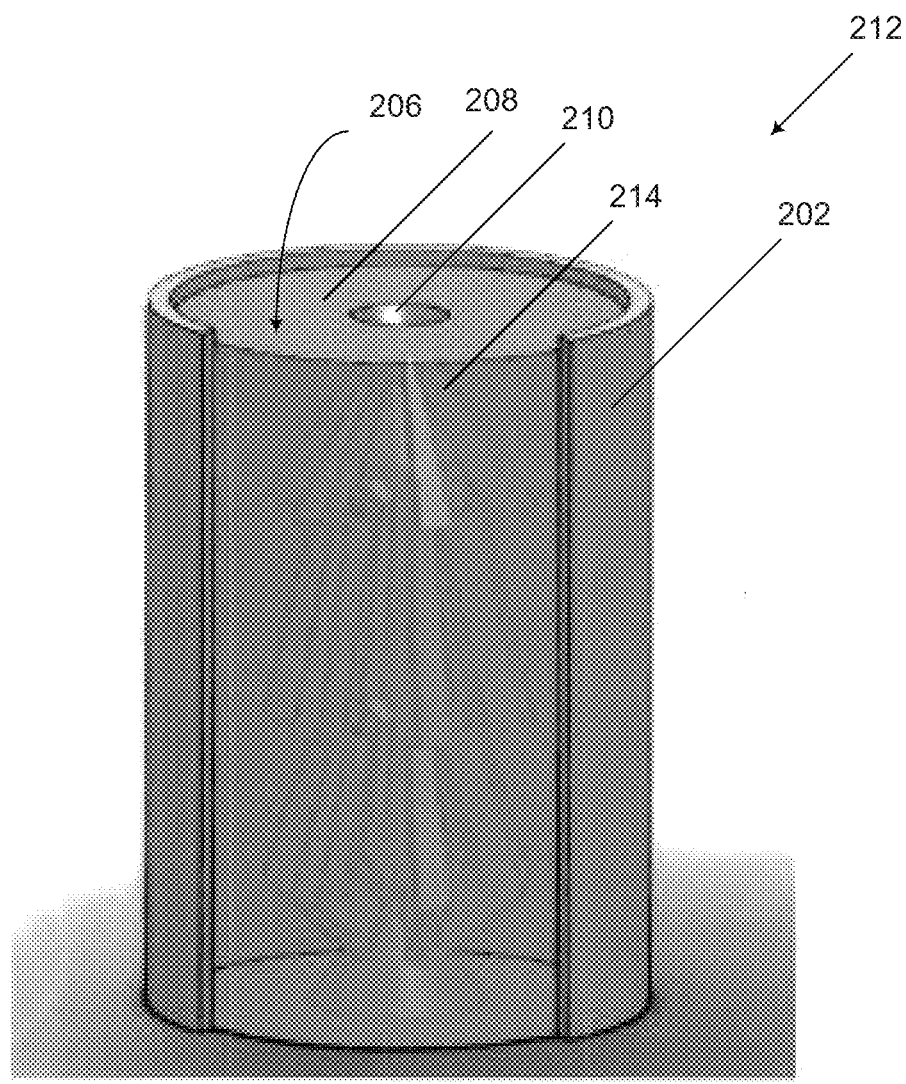

FIG. 4 illustrates an example fuel grain apparatus according to one embodiment of the invention.

Figure 5:
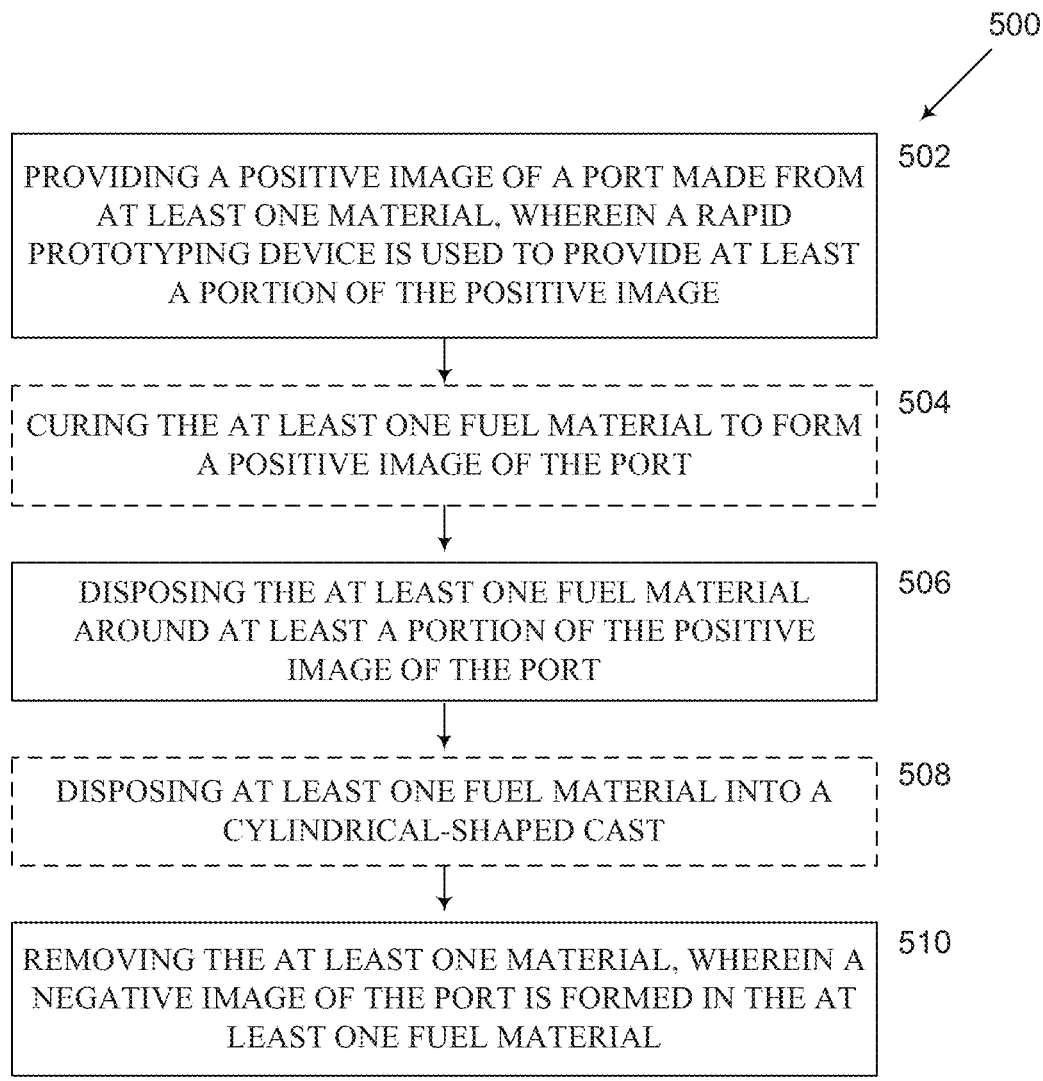

FIG. 5 illustrates an example flowchart of an example method according to one embodiment of the invention.

Figure 6:
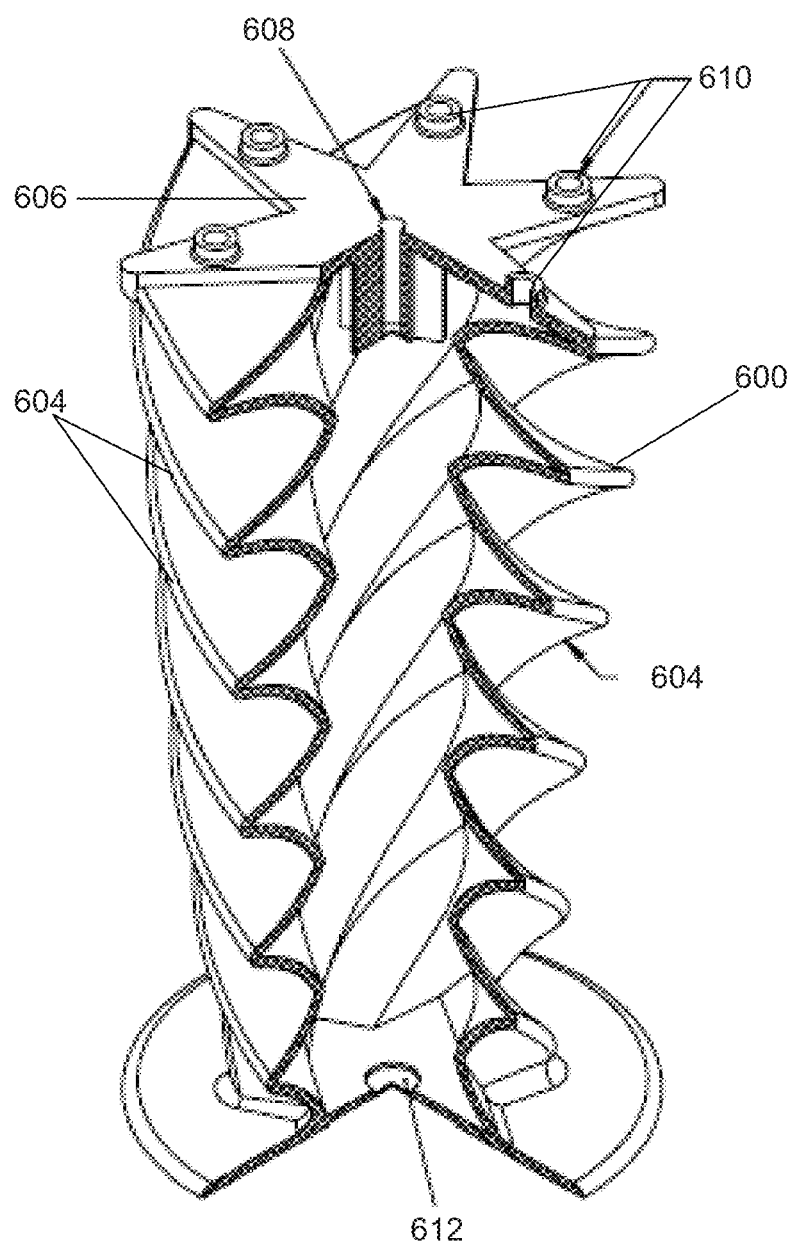

FIG. 6 illustrates and example positive image of a desired port shape for an example fuel grain apparatus in accordance with another embodiment of the invention.

DETAILED DESCRIPTION OF EXEMPLARY EMBODIMENTS OF THE INVENTION

Exemplary embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention. Like numbers refer to like elements throughout.

As used herein, the term "fuel grain" can refer to relatively solid fuel body for a rocket motor.

As used herein, the term "port" can refer to a generally open space within a fuel body for a rocket motor or a channel or multiple channels within a fuel body being made of a differing material for a rocket motor.

As used herein, the term "fuel material" can refer to a fuel, an additive, an inhibitor, a mixture of fuel and another compatible substance, or any substance that can be mixed with any of the foregoing.

As used herein, the term "positive image" can refer to an object with an external three dimensional shape. For example, a positive image can be an external three dimensional shape of a port for a fuel grain.

As used herein, the term "negative image" can refer to a relatively hollow three dimensional shape within a fuel grain. For example, the shape of a port within a fuel grain is referred to as a negative image within the fuel grain.

Certain embodiments of the invention generally provide for systems and methods for casting hybrid rocket motor fuel grains. Certain embodiments of systems and methods described herein can provide fuel grains for hybrid rocket motors used for satellite propulsion and other small motors. Because a variety of different shapes can be made using various system and methods according to embodiments of the invention, relatively complex hybrid rocket motor fuel grains can be formed for relatively larger hybrid or composite rocket motors. Lower costs, increased sizes, and freedom of choice to use different fuel materials can result in using certain embodiments of the systems and methods described herein. Furthermore, technical effects by certain embodiments of the invention can result such as the creation or formation of relatively complex port shapes within hybrid and/or composite rocket motor fuel grains. The complex shapes may assist in increasing the effective length and/or surface area of the associated port shape to improve better fuel/air mixing, increase oxidizer dwell time, improve propellant mass fraction, and minimize associated disruptions in the fuel flow and/or thrust provided in or by the hybrid and/or composite rocket motor fuel grains according to embodiments of the invention. One result of certain embodiments of the invention is increased thrust from fuel grains for hybrid rocket motors.

FIG. 1 illustrates an example system in accordance with an embodiment of the invention. In this example, the system can be a fuel grain fabrication system 100. The system 100 is shown with a computer 102 in communication with a dispenser 104 and a cast 106. The dispenser 104 can operate in conjunction with a fuel material source 108, a dispenser motor 110, and a dispenser heater 112. The system 100 can also operate in conjunction with a positive image material source 114, a removal/insertion device 116, and a curing device 118. It will be appreciated that while the disclosure may in certain instances describe only a single dispenser, cast, fuel material source, dispenser motor, dispenser heater, positive image material source, removal/insertion device, and curing device, there may be multiple dispensers, casts, fuel material sources, dispenser motors, dispenser heaters, positive image material sources, a removal/insertion devices, and curing devices without departing from example embodiments of the invention.

A computer 102 can include one or more processor-based devices capable of communicating with the other components of the system 100 via a signal, such as a wireless frequency signal or a direct wired communication signal. In at least one embodiment, more than one computer 102 can be in communication with respective components of the system 100 to transmit and receive communications between the components of the system 100. The processor 120 can execute computer-executable program instructions stored in a computer-readable medium or memory 122, such as a random access memory ("RAM"), read only memory ("ROM"), and/or a removable storage device, coupled to the processor 120. The computer 102 may operate on any operating application program including, but not limited to, Microsoft Windows®, Apple OSX™, Unix™, and Linux™. In one embodiment, the computer 102 may include computer executable program instructions stored in the memory 122 or processor 120 for processing one or more fuel grain fabrication instructions within the system 100. In one embodiment, a fuel grain fabrication application program 124 with one or more fuel grain fabrication instructions can be stored in memory 122 or the processor 120. In another embodiment, a fuel grain application program 124 or set of one or more fuel grain fabrication instructions can include rapid prototyping instructions, techniques, or associated methods. The I/O interface 126 can be one or more interfaces to facilitate communication with one or more other components of the system 100, such as, with the dispenser, the removal/insertion device, the curing device, the dispenser heater, and the dispenser motor. The computer 102 may also include any number of other external or internal devices such as a mouse, a CD-ROM, DVD, a keypad, a keyboard, a display, or other input or output devices. Suitable examples of a computer 102 may include mobile computers, handheld portable computers, digital assistants, personal digital assistants, cellular phones, mobile phones, smart phones, pagers, digital tablets, desktop computers, laptop computers, Internet appliances, and other processor-based devices.

Generally, the computer 102 can include a respective memory 122 and processor 120. The memory 122 can store data and information for subsequent retrieval. When needed, data or information such as computer-executable instructions stored in memory 122 may be transmitted to the processor 120 for execution and/or implementation. Suitable processors may comprise a microprocessor, an ASIC, and state machine. Example processors can be those provided by Intel Corporation (Santa Clara, Calif.), AMD Corporation (Sunnyvale, Calif.), and Motorola Corporation (Schaumburg, Ill.). Such processors comprise, or may be in communication with media, for example computer-readable media, which stores instructions that, when executed by the processor, cause the processor to perform the elements described herein. Embodiments of computer-readable media include, but are not limited to, an electronic, optical, magnetic, or other storage or transmission device capable of providing a processor, such as the processor 120, with computer-readable instructions. Other examples of suitable media include, but are not limited to, a floppy disk, CD-ROM, DVD, magnetic disk, memory chip, ROM, RAM, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Generally, the cast 106 can be or otherwise can include a platform or form operable to support a fuel grain apparatus, such as 128. In one embodiment, a cast can be a cylindrical-shaped form. In other embodiments, a cast can be any shape. In another embodiment, a cast can be a cylindrical-shaped form mounted to or otherwise including a relatively horizontal platform. In any instance, the fuel grain apparatus 128 is typically formed by dispensing at least one fuel material, such as hydroxyl terminated polybutadiene (HTPB) or acrylonitrile butadiene styrene (ABS), into the cast 106. In other embodiments, other fuel materials or combinations of fuel materials can be used to form a fuel grain apparatus including, but not limited to, a hybrid rocket motor fuel, one or more oxidizers, a composite solid rocket motor fuel, paraffin wax, acrylic, polyvinyl chloride, polycarbonate, acetyl, polyethylene, salami, wood, or paper. Other additives can be used to form a fuel grain apparatus including, but not limited to, fuel markers, fuel colorants, additives that affect the color of a fuel flame, opacifiers, catalysts, plasticizers, hardeners, energy increasing or enhancing solids, or powdered metals such as aluminum powder. One will recognize the applicability of embodiments of the invention to various fuel materials, oxidizers, other additives, and combinations thereof known in the art.

Relatively complex or three-dimensional port shapes can be formed in the fuel grain 128 using certain embodiments of the fuel grain fabrication system 100. These types of port shapes can facilitate improved mixing of the fuel, oxidizer, and any other additives while the fuel is being burned since these types of port shapes can have increased surface area over conventional port shapes. Certain types of port shapes can also be formed to facilitate control over the regression rate, such as slowing or increasing the rate, while other port shapes may decrease or increase the turbulence during burning of the fuel. Ultimately, improved efficiency in mixing and burning the fuel can be achieved, which can lead to improved thrust from the rocket motor fuel grain apparatus. Using systems and methods in accordance with embodiments of the invention, such as fuel grain fabrication system 100, an object such as a positive image 130 can be mounted or otherwise supported within the cast 106. Typically, the positive image 130 is shaped to form a desired port within the fuel grain apparatus. In certain embodiments, a positive image can include at least one non-longitudinal feature. In other embodiments, a positive image can include, but is not limited to, at least one of the following: a helical shape, a concentric disk shape, a series of anteriorially linked disk shapes, or three-dimensional geometric shape with at least one non-longitudinal feature. In yet other embodiments, multiple port designs can be formed in a fuel grain apparatus, that is, multiple independent respective port structures and/or one or more ports with different geometric shapes. In further embodiments, a positive image can include a relatively thin-walled structure incorporating some or all of the above shapes. In any instance, when at least one fuel is dispensed into the cast 106 with the positive image 130 within the cast 106, the at least one fuel material can fill any space between the positive image 130 and the cast 106.

Generally, the dispenser 104 can be a device in communication with at least one positive image material source, such as 114. The dispenser 104 may have one or more associated nozzles, such as 132, which may operate in conjunction with a dispenser motor 110 and dispenser heater 112 to control the dispensing of at least one material from the positive image material source 114 with respect to the cast 106. In one embodiment, the dispenser 104 can utilize rapid prototyping instructions, techniques, or similar methods to dispense at least one material such as a water soluble polymer onto or within the cast 106 to form the positive image 130.

There are several rapid prototyping techniques including but not limited to stereolithography, fused deposition modeling, selective laser sintering, laminated object manufacturing, and 3-D printing. Stereolithography uses a photopolymer and a curing mechanism. Fused deposition modeling and 3D printing rapid prototyping processes melt plastic and inject the plastic through a moving nozzle or lay down a field of granules, which are selectively bonded together with a binding agent or sintered together with a powerful laser heat source. In all cases, a three-dimensional form is created under computer control by building up substantially two-dimensional layers. For example, one or more dispensers 104 can include any number of respective dispenser motors 110, dispenser heaters 112, and associated nozzles 132 to dispense relatively small quantities of at least one material from the positive image material source 114 onto or within the cast 106 to form a desired shape, pattern, geometry, such as a relatively complex or otherwise desired port shape for a fuel grain apparatus.

In selective laser sintering, a field of powder is laid down and a laser selectively melts or sinters the powder particles to form a thin continuous film. Another powder layer is applied and melted on top of the first layer. This is repeated until a 3-D shape is built up. Channels of un-sintered material can be cleared of unincorporated particles to produce the positive image of the port structure.

In fused deposition modeling, a bead of molten material is extruded through a nozzle like extrusion head. As the head is moved, a trail of extruded material solidifies behind it. In certain exemplary embodiments, a support material can also be laid down at the same time or shortly before or after so that otherwise unsupported design features can be supported while the shape is built up. The process is repeated with another layer on top of the first and this is repeated until a 3-D object is built up. In embodiments where a support material is used, the support material is removed, usually by dissolving in water, leaving the positive image of the port structure.

In stereolithography, a film of liquid photopolymer is selectively cured by exposure to light, usually from a laser. After the first layer of photopolymer is cured, the cured layer is submerged and another layer is cured on top of it. Uncured regions are left liquid and may need to be removed, such as by draining them away. What remains in this exemplary embodiment is a positive image of the port structure.

In laminated object manufacturing, a composite structure of adhesive-backed paper or polymer is created by laying down thin sheets or films with a heated roller and cutting them with a laser. The process is repeated, layer upon layer to build up a 3-D structure. Non-part areas are separated from the designed part by laser cutting and then further cut into small pieces which are removed after the part is finished. The area remaining forms the positive image of the port structure.

In one form of 3-D Printing, a powder is laid down and a print head, similar to that of an ink-jet printer selectively sprays a fine jet of chemical binder, which cements particles together to make a patterned, contiguous film. Another layer of powder is laid down over this and the binder is sprayed again in another pattern, linking particles of powder together and to the layer below. This process is repeated until a 3-D shape is built up. Channels or areas left in a form where binder was not sprayed can be cleared of unincorporated material, with the area remaining forming the positive image of the port structure.

In another form of 3-D Printing, a photopolymer is selectively sprayed from a print head and cured by radiation from a flood lamp. Successive layers are built up to make a 3-D object, which forms the positive image of the port structure. Any one of these rapid prototyping techniques described above can be used to create the positive port image described herein.

In the embodiment shown in FIG. 1, the dispenser 104 can also be in communication with at least one fuel material source, such as 108. The dispenser 104 may have one or more associated nozzles, such as 132, which may operate in conjunction with a dispenser motor 110 and dispenser heater 112 to control the dispensing of at least one fuel from the fuel material source 108 with respect to the cast 106. In one embodiment, the dispenser 104 can dispense at least one fuel material in some or all of the space between the positive image 130 and the cast 106. In one embodiment, the dispenser 104 can be a rapid prototyping device.

Even though a single dispenser, dispenser motor, dispenser heater, nozzle, fuel material source, positive image material source are shown in FIG. 1, in certain other embodiments, a separate respective dispenser, dispenser motor, dispenser heater, nozzle, fuel material source, and positive image material source for dispensing the fuel material can be utilized. In other embodiments, multiple dispensers, dispenser motors, dispenser heaters, nozzles, fuel material sources, and/or positive image material sources can be used for dispensing at least one positive image material, and multiple dispensers, dispenser motors, dispenser heaters, nozzles, and/or fuel material sources can be used for dispensing at least one fuel. Speed, control, efficiency, cost, material and fuel material selection and compatibility, and other considerations may affect the number of dispensers and associated components used to dispense at least one positive image material and at least one fuel material. In any instance, embodiments of the invention can dispense at least one positive image material and at least one fuel material with respect to the cast 106.

In one embodiment, a dispenser similar to 104 can utilize multiple fuel material sources, similar to 108, and/or may utilize multiple nozzles, similar to 132, to dispense multiple fuel materials in some or all of the space between a positive image 130 and a cast 106. In this embodiment, a system such as 100 may switch between multiple fuel material sources, dispensers, and nozzles, as needed to dispense multiple fuel materials in some or all of the space between a positive image 130 and a cast 106. For example, using this embodiment, a system such as 100 can form a fuel grain apparatus with different fuel material burning properties depending upon the region of the fuel grain apparatus. In this instance, a fuel grain apparatus could have a relatively high energy, fast burning fuel material in the central portion of the fuel grain apparatus, and a relatively less energetic, slower burning fuel material adjacent to the outer portion of the fuel grain apparatus.

Generally, the removal/insertion device 116 can interact with the cast 106 to remove the positive image 130 from the cast 106, and may in some instances, be operable to facilitate inserting or otherwise mounting the positive image 130 within or with respect to the cast 106. In the embodiment shown in FIG. 1, the removal/insertion device 116 can be one or more dispensers similar to 104 operable to apply one or more substances to dissolve, melt, change a state of, or otherwise remove the at least one material forming the positive image 130 within or with respect to the cast 106. For example, if the at least one material forming the positive image 130 is a soluble polymer or water soluble polymer, the substance applied by the removal/insertion device 116 to the positive image 130 can be or otherwise include one or more solvents or water. Examples of suitable solvents can include, but are not limited to, alcohol, xylene, acetone, etc.

In certain embodiments, the removal/insertion device 116 can be operable for dispensing at least one positive image material, and may operate similar to or in conjunction with the dispenser, dispenser motor, dispenser heater, nozzle, fuel material source, and/or positive image material source described above. For example, in one embodiment, a removal/insertion device such as 116 may be operable to dispense at least one positive image material to form a positive image 130 with respect to a cast such as 106, and may be further operable to remove the positive image 130 by applying one or more substances to dissolve, melt, change a state of, or otherwise remove the at least one material forming the positive image 130 within or with respect to the cast 106. In any instance, the removal/insertion device 116 can coordinate with the cast to suitably remove the positive image 130 from the cast 106 when needed.

In other embodiments, the removal/insertion device or dispenser may implement or facilitate an environmental change of ambient condition, such as temperature and/or pressure which removes, melts, dissolves, or otherwise changes the condition or state of the at least one positive image material, wherein the positive image is removed.

In one embodiment, a relatively thin walled structure can be formed by the dispenser 104, wherein the relatively thin walled structure has the desired shape of the positive image 130. The relatively thin walled structure can be left in place within the cast 106 rather than removing it with the removal/insertion device 116. At least one suitable material and/or fuel for forming a relatively thin walled structure can be a hybrid fuel.

Generally, the curing device 118 can interact with the at least one material forming the positive image 130 within or with respect to the cast 106 to suitably cure the at least one material. For example, in the embodiment shown, the curing device 118 may include a heating and/or cooling element to increase or decrease the temperature of at least one material forming the positive image 130 within or with respect to the cast 106. The curing device may selectively heat and/or cool certain portions of the at least one material forming the positive image 130 and/or the cast 106, or in other instances, may attempt to heat or cool the entirety of the at least one material forming the positive image 130 and/or the cast 106. In another embodiment, a curing device such as 118 may apply a substance or combination of substances to suitably cure the at least one material forming the positive image 130 within or with respect to the cast 106. In yet another embodiment, a curing device such as 118 may apply a change in environmental or ambient condition, such as change in pressure or exposure to certain radiation wavelength, to suitably cure the at least one material forming the positive image 130 within or with respect to the cast 106. In any instance, the curing device 118 can suitably cure the at least one material forming the positive image 130.

In the embodiment illustrated in FIG. 1, at least one user may operate the computer, for example 102, by inputting or selecting a particular port shape, fuel grain shape, and fuel type from a user interface, and in some instances, making available at least one fuel source, such as 108, to the system 100. The computer 102 can execute a fuel grain fabrication application program, such as 126, or other sets of fuel grain fabrication instructions to facilitate fabricating a fuel grain. The computer 102 can control any number of system components such as the dispenser 104 and cast 106 during execution of the fuel grain fabrication application program 126 or other sets of fuel grain fabrication instructions.

In the embodiment shown in FIG. 1, the dispenser 104 can interact with the cast 106. The dispenser 104 can dispense at least one material to form a positive image 130 onto or within the cast 106. In one embodiment, the removal/insertion device 116 can dispense at least one material to form a positive image 130 in a desired port shape onto or within the cast 106. In certain exemplary embodiments, the at least one material can include an oxidizer. In other exemplary embodiments, the at least one material can include, in addition to or instead of the oxidizer, opacifiers, such as carbon, burn-rate modifiers and/or energy enhancing fuels, such as aluminum. In yet another exemplary embodiment, the at least one material includes a rubber or rubber-like (elastomeric) compound. In any instance, the curing device 118 can cure the at least one material before the dispenser 104 begins dispensing at least one fuel in the space between the positive image 130 and the cast 106. A fuel grain apparatus 128 in the shape of the cast 106 is thereby formed. The removal/insertion device 116 can remove the positive image 130 from the cast 106 and fuel grain apparatus 128 by, for example, using at least one substance such as water to remove, dissolve, or otherwise melt the at least one material forming the positive image 130.

Alternatively, for embodiments in which the at least one material forming the positive image includes an oxidizer, opacifier, burn-rate modifier and/or energy enhancing fuel, as described above, the positive image can be left in place. In this alternative embodiment, in use, the positive image of the port can be ignited along with the fuel. Providing an oxidizer, opacifier, burn-rate modifier, and/or energy enhancing fuel mixed in with the at least one material forming the positive image can assist in getting the entire port material burning quickly and help to bring the rocket motor up to its optimum operating pressure more quickly. Further, by adding an oxidizer, opacifier, burn-rate modifier, and/or energy enhancing fuel and leaving the positive image of the port material in place for use with the rocket motor, the positive image of the port material can act as a moisture barrier, thereby protecting the fuel from potential contamination.

For embodiments where the positive image is removed, dissolved or otherwise melted, when the positive image 130 is removed from the cast 106 and fuel grain apparatus 128, a negative image in the desired port shape remains in the fuel grain apparatus 128. The fuel grain apparatus 128 can then be removed from the cast 106 either manually or by the removal/insertion device 116.

Other system embodiments in accordance with the invention can include fewer or greater numbers of components and may incorporate some or all of the functionality described with respect to the system components shown in FIG. 1.

FIG. 2 illustrates a front cutaway view of an example cast with an example positive image of a desired port shape for an example fuel grain apparatus in accordance with one embodiment of the invention. As shown in FIG. 2, a positive image 200 of a desired port shape for a fuel grain apparatus, such as 128 in FIG. 1, can be disposed within a cast 202. For ease of viewing, the front portion of the cast 202 is removed to illustrate the positive image 200 in a relatively vertical orientation with respect to a cylindrical-shaped cast 202. The positive image 200 can include one or more relatively complex shapes such as at least one non-longitudinal feature 204. In other embodiments, a positive image such as 200 can include, but is not limited to, at least one of the following: a helical shape, a concentric disk shape, a series of anteriorially linked disk shapes, or a three-dimensional geometric shape with at least one non-longitudinal feature. In any instance, an area 206 between the external surface of the positive shape 200 and the internal surface of the cast 202 can be substantially filled by at least one fuel.

FIG. 3 illustrates a front cutaway view of an example cast with an example positive image of a desired port shape in an example fuel grain apparatus in accordance with one embodiment of the invention. As shown in FIG. 3, a positive image 200 of the desired port shape for a fuel grain apparatus can be disposed within a cast 202. The area 206 between the external surface of the positive shape 200 and the internal surface of the cast 202 can be substantially filled by at least one fuel material 208, which is solidified around an external surface of the positive image 200 and further shaped by the internal surface of the cast.

FIG. 4 illustrates an example fuel grain apparatus according to one embodiment of the invention. As shown in FIG. 4, a negative image 210 of the desired port shape for a fuel grain apparatus can be disposed within a fuel grain apparatus 212. After the area 206 between the external surface of the positive shape 200 and the internal surface of the cast 202 is substantially filled by at least one fuel material 208, the positive image 200 shown in FIGS. 2 and 3 is removed to leave a negative image 210 in the fuel grain apparatus 212.

FIG. 6 illustrates a perspective view of an example positive image of a desired port shape for an example fuel grain apparatus in accordance with another embodiment of the invention. As shown in FIG. 6, a positive image 600 of a desired port shape for a fuel grain apparatus, such as 128 in FIG. 1, can be disposed within a cast similar to that shown in FIG. 2. The positive image 600 can include one or more relatively complex shapes, such as at least one helical-shaped feature 604. In other embodiments, a positive image such as 600 can include, but is not limited to, at least one of the following: a non-longitudinal feature, a concentric disk shape, a series of anteriorially linked disk shapes, or a three-dimensional geometric shape with at least one non-longitudinal feature. In any instance, an area between the external surface of the positive shape 600 and the internal surface of the cast can be substantially filled by at least one fuel.

The exemplary positive image 600 can also include a top surface 606 having a defined shape. In FIG. 6, the defined shape of the top surface 606 is a six-pointed star, however any other type of shape, including circular, may be alternatively used based on the design requirements of the developer. The top surface 606 of the positive image 600 can also include an aperture 608 sized and shaped to receive all or a portion of an igniter therein. In certain exemplary embodiments, the aperture 608 is positioned along the center of the top surface 606. Alternatively, the igniter mounting aperture 608 can be positioned anywhere along the top surface 606 of the positive image 600. In an alternative embodiment, the positive image can include two or more igniter mounting apertures positioned along different portions of the top surface 606 for situations where multiple igniters are used.

The exemplary positive image 600 can also include one or more oxidizer inlets 610. The example oxidizer inlets have a generally cylindrical shape, however, the inlets 610 can have any other desired shape in alternative embodiments. In the example of FIG. 6, an oxidizer inlet 610 is generated or created on the top surface 606 on each of the six points of the six-pointed star-shaped top surface 606. Alternatively, a different number or arrangement of oxidizer inlets 610 can be created on the top surface 606 of the positive image 600. Further, while the exemplary oxidizer inlets 610 are shown disposed on a top surface 606 of the positive image 600, in alternative embodiments, the oxidizer inlets 610 can extend up or out from other portions of the positive image 600 other than a flat top surface. The positioning of the oxidizer inlets 610 can generally correspond with the positioning of the oxidizer inlet ports in the rocket motor, such that, if the positive image is removed from the fuel grain, the negative remaining image will be an aperture for the respective oxidizer inlet ports to go into or will extend into the respective oxidizer inlet ports.

The exemplary positive image 600 can also include a burst disk aperture 612 positioned along the bottom end of the positive image 600. In one example, the burst disk aperture 612 is positioned near the center of a bottom surface of the positive image. However, the position of the burst disk aperture 612 can be along other portions of the positive image near its bottom side in other embodiments. The exemplary burst disk aperture 612 can be sized and shaped to receive a burst disk therein.

Although FIGS. 2-4 and 6 illustrate example fuel grain apparatus made with certain embodiments of the invention, in other embodiments, multiple fuel grain apparatus with desired port shapes made with certain embodiments of the invention can be stacked or otherwise combined to create relatively large rocket motors.

One skilled in the art may recognize the applicability of embodiments of the invention to other environments, contexts, and applications. One will appreciate that components of the system 100 and apparatus or fuel grain apparatus 212 shown in and described with respect to FIGS. 1-4 and 6 are provided by way of example only. Numerous other operating environments, system architectures, and apparatus configurations are possible. Accordingly, embodiments of the invention should not be construed as being limited to any particular operating environment, system architecture, or apparatus configuration.

Embodiments of a system, such as 100, can facilitate casting hybrid rocket motor fuel grains. Improvements in fabricating hybrid rocket motor fuel grains, can be achieved by way of implementation of various embodiments of the system 100, the apparatus or fuel grain apparatus described in FIGS. 2-4 and 6, and methods described herein. Example methods and processes which can be implemented with the example system 100 are described by reference to FIG. 5.

FIG. 5 illustrates an example method of casting a rocket motor fuel grain.

The method 500 begins at block 502, in which a positive image of a port made from at least one material is provided, wherein a rapid prototyping device is used to shape at least a portion of the at least one material. In the embodiment shown in FIG. 5, a dispenser such as 104 in FIG. 1 can dispense at least one material within or onto a cast such as 106 to form a positive image of a desired port shape. An example positive image is shown as 130 in FIG. 1 or 200 in FIG. 2. In other embodiments, a removal/insertion device such as 116 in FIG. 1 can also dispense at least one material within or onto a cast such as 106 to form a positive image of a desired port shape.

In one aspect of one embodiment, block 502 is followed by optional block 504, in which the at least one material is cured to form a positive image of the port. In the embodiment shown in FIG. 5, a curing device such as 118 in FIG. 1 can cure the at least one material to suitably cure the at least one material. For example, in the embodiment shown, the curing device 118 may include a heating and/or cooling element to increase or decrease the temperature of at least one material forming the positive image 130, 200. In certain embodiments, the curing device may selectively heat and/or cool certain portions of the at least one material forming the positive image 130, 200 and/or an associated cast such as 106, or in other instances, may attempt to heat or cool the entirety of the at least one material forming the positive image 130, 200 and/or the cast 106. In another embodiment, a curing device such as 118 may apply a substance or combination of substances to suitably cure the at least one material forming the positive image 130, 200 within or with respect to the cast 106. In yet another embodiment, a curing device such as 118 may apply a change in environmental or ambient condition, such as change in pressure or exposure to certain radiation wavelength, to suitably cure the at least one material forming the positive image 130 within or with respect to the cast 106. In any instance, the curing device 118 can suitably cure the at least one material forming the positive image 130.

In one aspect of one embodiment, the port can include, but is not limited to, at least one non-longitudinal feature.

In one aspect of one embodiment, the port can include, but is not limited to, at least one of the following: a helical shape, a concentric disk shape, a series of anteriorially linked disk shapes, a three-dimensional geometric shape with at least one non-longitudinal feature, or a relatively thin walled structure incorporating some or all of the foregoing shapes.

In one aspect of one embodiment, the at least one material can include, but is not limited to, at least one of the following: a soluble polymer, or a water soluble polymer.

Optional block 504 is followed by block 506, in which at least one fuel material is disposed around at least a portion of the positive image of the port. In the embodiment shown in FIG. 5, the dispenser 104 can dispense at least one fuel material from the fuel material source such as 108 in FIG. 1 adjacent to the positive image 130, 200. For example, the dispenser 104 can dispense a fuel material in the space between an interior surface of a cast 106 and the external surface of the positive image 130, 200.

In one aspect of one embodiment, block 506 is followed by optional block 508, in which the at least one fuel material is disposed into a cylindrical-shaped cast. In the embodiment shown in FIG. 5, the dispenser 104 can dispense at least one fuel material from the fuel material source such as 108 adjacent to the positive image 130, 200 in the space between an interior surface of a cylindrical-shaped cast such as 206 in FIGS. 2-4 and the external surface of the positive image 130, 200.

In one aspect of one embodiment, the at least one fuel material can include, but is not limited to, at least one of the following: hydroxyl terminated polybutadiene (HTPB), acrylonitrile butadiene styrene (ABS), a hybrid rocket motor fuel, one or more oxidizers, a composite solid rocket motor fuel, paraffin wax, acrylic, polyvinyl chloride, polycarbonate, acetyl, polyethylene, salami, wood, or paper.

In one aspect of one embodiment, the at least one fuel material can include, but is not limited to, at least one of the following: fuel markers, fuel colorants, additives that affect the color of a fuel flame, opacifiers, catalysts, plasticizers, hardeners, energy increasing or enhancing solids, or powdered metals such as aluminum powder.

Optional block 508 is followed by block 510, in which the at least one material is removed, wherein a negative image of the port is formed in the at least one fuel material. In the embodiment shown in FIG. 5, the removal/insertion device such as 116 in FIG. 1 can remove the at least one positive image material forming the positive image 130, 200, wherein a negative image such as 210 in FIG. 4 remains in the at least one fuel material or fuel grain apparatus such as 212 in FIG. 4. For example, the removal/insertion device 116 can dispense at least one substance to dissolve, melt, change a state of, or otherwise remove the at least one positive image material forming the positive image 130, 200. In another embodiment, the dispenser 104 of FIG. 1 may remove the at least one positive image material forming the positive image 130, 200, wherein a negative image such as 210 in FIG. 4 remains in the at least one fuel material or fuel grain apparatus such as 212 in FIG. 4. For example, the dispenser 104 may dispense at least one substance to dissolve, melt, change a state of, or otherwise remove the at least one positive image material forming the positive image 130, 200.

In one aspect of one embodiment, removing the at least one material comprises at least one of: melting the at least one material, dissolving the at least one material, or changing a state of the at least one material.

In one aspect of one embodiment, the removal/insertion device or dispenser may implement or facilitate an environmental change of ambient condition, such as temperature and/or pressure which removes, melts, dissolves, or otherwise changes the condition or state of the at least one positive image material, wherein the positive image is removed.

After block 510, the method 500 ends.

Embodiments of the invention are described above with reference to block diagrams and flowchart illustrations of systems, methods, apparatuses and computer program products. It will be understood that some or all of the blocks of the block diagrams and flowchart illustrations, and combinations of blocks in the block diagrams and flowchart illustrations, respectively, can be implemented by computer program instructions. These computer program instructions may be loaded onto a general purpose computer, special purpose computer such as a switch, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational elements or steps to be performed on the computer or other programmable apparatus to produce a computer-implemented process such that the instructions that execute on the computer or other programmable apparatus provide elements or steps for implementing the functions specified in the flowchart block or blocks.

Accordingly, blocks of the block diagrams and flowchart illustrations may support combinations of means for performing the specified functions, combinations of elements for performing the specified functions, and program instruction means for performing the specified functions. It will also be understood that some or all of the blocks of the block diagrams and flowchart illustrations, and combinations of blocks in the block diagrams and flowchart illustrations, can be implemented by special purpose hardware-based computer systems that perform the specified functions, elements, or combinations of special purpose hardware and computer instructions.

Additionally, it is to be recognized that, while the invention has been described above in terms of one or more embodiments, it is not limited thereto. Various features and aspects of the above described invention may be used individually or jointly. Although the invention has been described in the context of its implementation in a particular environment and for particular purposes, its usefulness is not limited thereto and the invention can be beneficially utilized in any number of environments and implementations. Furthermore, while the methods have been described as occurring in a specific sequence, it is appreciated that the order of performing the methods is not limited to that illustrated and described herein, and that not every element described and illustrated need be performed. Accordingly, the claims set forth below should be construed in view of the full breadth of the embodiments as disclosed herein.

What is claimed is:

1. A method comprising:
   casting a rocket motor fuel grain, the casting method comprising:
   providing a rocket motor fuel grain mold cast;
   generating a positive image of a port made from at least one material in at least a portion of the rocket motor fuel grain mold cast, wherein a rapid prototyping device is used to generate at least a portion of the positive image; and
   disposing within the rocket motor fuel grain cast at least one fuel material around at least a portion of the positive image of the port.

2. The method of claim 1, wherein the port comprises at least one non-longitudinal feature.

3. The method of claim 1, wherein the port comprises a thin walled structure incorporating some or all of a helical shape, a concentric disk shape, a series of anteriorially linked disk shapes, or a three-dimensional geometric shape with at least one non-longitudinal feature.

4. The method of claim 1, wherein the at least one material comprises a soluble polymer.

5. The method of claim 1, wherein the at least one material comprises an oxidizer.

6. The method of claim 1, wherein the at least one fuel material comprises a composite solid rocket motor fuel.

7. The method of claim 1, further comprising:
   removing the at least one material making up the positive image of the port, wherein removing the at least one material comprises changing a state of the at least one material.

8. The method of claim 1, wherein the rocket motor fuel grain mold cast is a shaped cast.

9. The method of claim 1, further comprising curing the at least one fuel material to form a negative image of the port in the cured fuel material.

10. A method comprising:
    casting a rocket motor fuel grain, the casting method comprising:
    providing a rocket motor fuel grain mold cast;
    providing, in at least a portion of the rocket motor fuel grain mold cast, a positive image of a helical-shaped port made from at least one material comprising an oxidizer, wherein a rapid prototyping device is used to provide at least a portion of the positive image; and
    disposing within the rocket motor fuel grain cast at least one fuel material around at least a portion of the positive image of the helical-shaped port.

11. The method of claim 10, wherein the port further comprises at least one non-longitudinal feature.

12. The method of claim 10, wherein the at least one material further comprises a soluble polymer.

13. The method of claim 10, wherein the at least one fuel material comprises a composite solid rocket motor fuel.

14. The method of claim 10, further comprising:
    removing the at least one material making up the positive image of the port from within the at least one fuel material, wherein removing the at least one material comprises changing a state of the at least one material.

15. The method of claim 10, wherein the rocket motor fuel grain mold cast is a shaped cast.

16. A method comprising:
    casting a rocket motor fuel grain, the casting method comprising:
    providing a rocket motor fuel grain cast;
    generating, in at least a portion of the rocket motor fuel grain mold cast, a positive image of a port made from at least one material comprising a soluble polymer, wherein a rapid prototyping device is used to provide at least a portion of the positive image;
    disposing, in the rocket motor fuel grain cast, at least one fuel material around at least a portion of the positive image of the port; and
    removing the at least one material by changing a state of the at least one material; and
    curing the at least one fuel material to form a negative image of the port in the cured fuel material.

17. The method of claim 16, wherein the port comprises a thin walled structure incorporating some or all of a helical shape, a concentric disk shape, a series of anteriorially linked disk shapes, or a three-dimensional geometric shape with at least one non-longitudinal feature.

18. The method of claim 16, wherein the at least one fuel material comprises a composite solid rocket motor fuel.

19. The method of claim 16, wherein the rocket motor fuel grain mold cast is a shaped cast.

20. The method of claim 16, wherein the at least one fuel material comprises an oxidizer.

* * * * *